US006982303B2

(12) United States Patent
Kerres et al.

(10) Patent No.: US 6,982,303 B2
(45) Date of Patent: Jan. 3, 2006

(54) COVALENTLY CROSS-LINKED POLYMERS AND POLYMER MEMBRANES VIA SULFINATE ALKYLATION

(76) Inventors: Jochen Kerres, Asternweg 11, Ostfildern (DE), 73760; Wei Zhang, Schwarzwaldstr. 12, Stuttgart (DE), 70569; Chy-Ming Tang, Hölderlinstr. 11, Weinheim (DE), 69469; Thomas Häring, Feigenweg 15, Stuttgart (DE), 70619

(*) Notice: Subject to any disclaimer, the term of this patent is extended or adjusted under 35 U.S.C. 154(b) by 0 days.

(21) Appl. No.: 10/173,830

(22) Filed: Jun. 19, 2002

(65) Prior Publication Data
US 2003/0032739 A1 Feb. 13, 2003

Related U.S. Application Data

(63) Continuation-in-part of application No. 10/051,196, filed on Jan. 22, 2002, now abandoned, which is a continuation of application No. PCT/EP01/05826, filed on May 21, 2001.

(30) Foreign Application Priority Data

May 19, 2000 (DE) .......................................... 100 24 575
Nov. 2, 2000 (DE) .......................................... 100 54 233

(51) Int. Cl.
*C08F 283/00* (2006.01)
*C08G 75/00* (2006.01)
*C08L 81/00* (2006.01)

(52) U.S. Cl. .................... 525/535; 525/328.5; 525/540; 528/391; 528/373; 528/482; 528/486; 528/491; 528/499; 528/501; 528/502; 528/503

(58) Field of Classification Search ................. 525/535, 525/328.5, 540; 528/391, 373, 482, 486, 528/491, 499, 501, 502, 503
See application file for complete search history.

(56) References Cited

U.S. PATENT DOCUMENTS 5,429,759 A 7/1995 Andrieu et al.

FOREIGN PATENT DOCUMENTS

FR WO 99/28292 6/1999
GB WO 00/15691 3/2000

OTHER PUBLICATIONS

10/051,196 Claims'copy.*
International Search Report.

* cited by examiner

*Primary Examiner*—Duc Truong
(74) *Attorney, Agent, or Firm*—MacPherson Kwok Chen & Heid LLP

(57) ABSTRACT

A covalently cross-linked polymer or polymer membrane consisting of one or more polymers, which can bear the following functional groups (M=Hal(F, Cl, Br, I), OR, NR2; R=alkyl, hydroxyalkyl, aryl; (Me=H, Li, Na, K, Cs, or other metal cations or ammonium ions): a) precursors of cation exchange groups: $SO_2M$ and/or $POM_2$ and/or COM b) sulphinate groups $SO_2Me$ and which can be covalently cross-linked using the following organic compounds: a) di-, tri- or oligofunctional haloalkanes or haloaromatics, which have been reacted with sulphinate groups $SO_2Me$, whereby the following cross-linking bridges are present in the polymer/in the polymer blend/in the polymer membrane: (Y=cross-linking bridges, X=Hal (F, Cl, Br, I), OR, $(CH_2)_x$—; -arylene-; —$(CH_2)_x$-arylene-; $CH_2$arylene-$CH_2$—, x=3–12): polymer-$SO_2Y$—$SO_2$-polymer and/or b) compounds containing the following groups: Hal-$(CH_2)_x$—NHR, one side of which (Hal-) has been reacted with sulphinate groups $SO_2ME$ and the other side (—NHR) with $SO_2M$ groups, whereby the following cross-linking bridges are present in the polymer/in the polymer blend/in the polymer membrane: polymer-$SO_2$—$(CH_2)_x$—NR—$SO_2$ polymer and/or c) compounds containing the following groups: NHR—$(CH_2)_x$—NHR, which have been reacted with sulphinate groups $SO_2ME$, whereby the following cross-linking bridges are present in the polymer/in the polymer blend/in the polymer membrane: polymer-$SO_2$—NR—$(CH_2)_x$—NR—$SO_2$-polymer.

20 Claims, 2 Drawing Sheets

Covalent cross-linking of a polymer sulfinate polymer sulfochloride blend with an α,ω-dihaloalkane and subsequent hydrolysis to a covalently cross-linked polymeric sulfonic acid blend

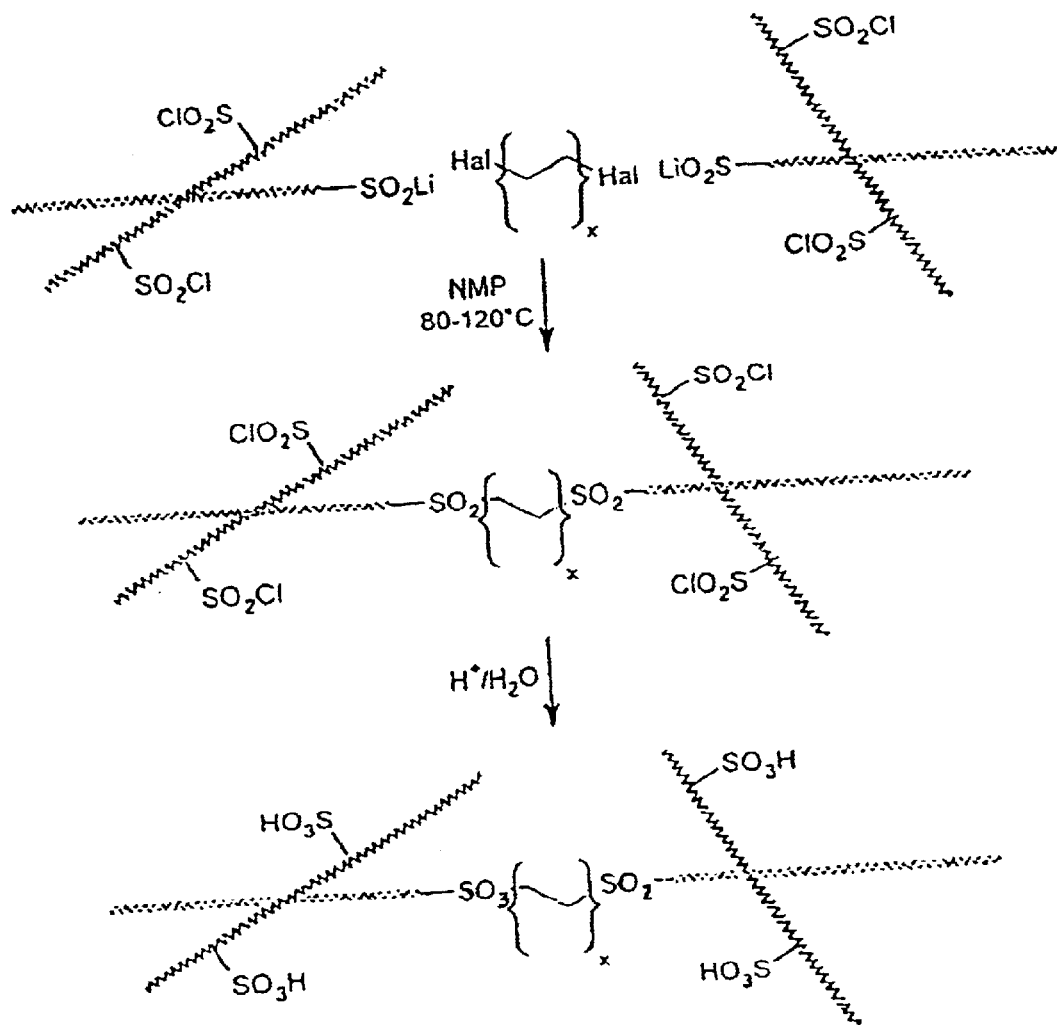
Fig. 1: Covalent cross-linking of a polymer sulfinate polymer sulfochloride blend with an α,ω-dihaloalkane and subsequent hydrolysis to a covalently cross-linked polymeric sulfonic acid blend

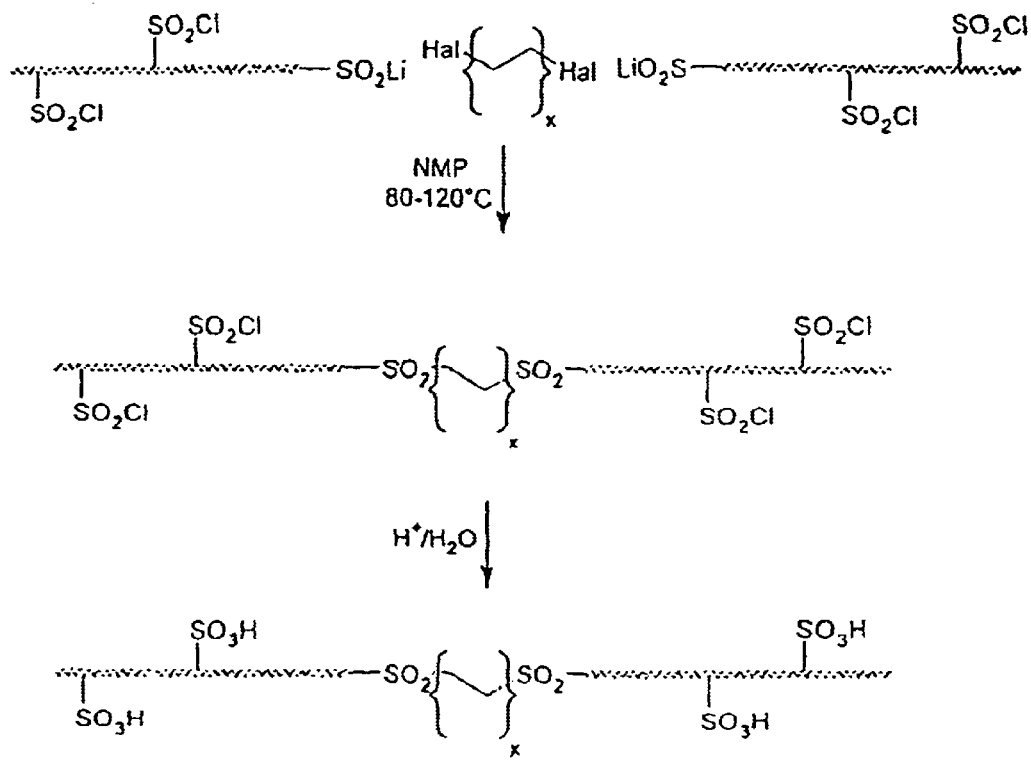
Fig. 2: Covalent cross-linking of a polymer containing sulfinate groups and sulfochloride groups with an α,ω-dihaloalkane and subsequent hydrolysis to a covalently cross-linked polymeric sulfonic acid ionomer

COVALENTLY CROSS-LINKED POLYMERS AND POLYMER MEMBRANES VIA SULFINATE ALKYLATION

This application is a CIP of application Ser. No. 10/051,196, filed Jan. 22, 2002, now abandoned, which is a CON of a national stage filing of PCT/EP01/05826 filed May 21, 2001.

DESCRIPTION

1. Prior Art

The author of this patent application has developed a new method for preparing covalently cross-linked ionomer membranes, which is based on an alkylation reaction of sulfinate groups-containing polymers, polymer blends and polymer (blend) membranes (J. Kerres, W. Cui, W. Schnurnberger: "Vernetzung von modifizierten Engineering Thermoplasten", German Patent 196 22 337.7 (Application dated Jun. 4, 1996), German Patent Office (1997), "Reticulation de Materiaux Thermoplastiques Industriels Modifies", French Patent F 97 06706 dated May 30, 1997). An advantage of the covalent network is its resistance to hydrolysis even at higher temperatures. A disadvantage of the ion conductive, covalently cross-linked polymers and polymer blends described in the above invention is the formation of a hydrophobic network when alkylating the sulfinate groups during forming the membrane, this hydrophobic network being partially incompatible with the ion conductive polymer (blend) component such as a sulfonated polymer polymer-$SO_3Me$, so that an inhomogeneous polymer (blend) morphology is generated, which reduces the mechanical stability (embrittlement on drying up!) and also prevents a complete cross-linking due to the partial separation of sulfinate phase and sulfonate phase.

2. Description

Thus, the object of the invention is to provide new covalently cross-linked polymers/membranes in which the covalently cross-linked polymer (blend) component is well compatible with the ion conductive polymer (blend) component.

This object is achieved by providing membranes according to claim 1. Further the process according to the invention adds to this purpose.

Thereto a polymer solution comprising polymers containing the following functional groups:

Sulfinate groups —$SO_2Me$ sulfochloride groups and/or other precursors of cation exchange groups, is prepared.

Additionally, a bifunctional or oligofunctional alkylation cross-linking agent (typically an α,ω-dihaloalkane) and optionally a secondary diamine cross-linking agent NHR—$(CH_2)_x$—NHR is added to the polymer solution. The formation of the covalent cross-linking bridges takes place during formation of the membrane when evaporating the solvent by alkylating the sulfinate groups and optionally by the formation of sulfonamide via reaction of the sulfohalogenide groups present in the polymer with the secondary amino groups of the diamine cross-linking agent. During the acidic and/or basic and/or neutral aqueous after-treatment of the membranes following the membrane formation, the precursors of the cation exchange groupings are hydrolyzed to form cation exchange groups.

FIG. 1 schematically shows the formation of the covalent cross-linking bridges in blends of sulfochlorinated polymer and sulfinated polymer.

FIG. 2 shows the formation of the covalent cross-linking bridges in a polymer containing both sulfinate groups and sulfochloride groups.

The composites according to the invention consist of polymers having the following functional groups:

After membrane preparation, before hydrolysis:

—$SO_2M$ and/or —$POM_2$ and/or —COM (M=Hal (F, Cl, Br, I), OR, $NR_2$; R=alkyl, hydroxyalkyl, aryl)

cross-linking bridges:

a) polymer-$SO_2$—Y—$SO_2$-polymer optionally;
b) polymer-$SO_2$—Y'—NR—$SO_2$-polymer
c) polymer-$SO_2$—NR—Y"—NR—$SO_2$-polymer After hydrolysis:

—$SO_3M$-, —$PO_3M_2$-, —COOM-groups above-mentioned cross-linking bridges

The covalently cross-linking of the sulfinate polymers in a mixture with precursors of cation exchange polymers results in a better mixing of blend phases and thus a higher degree of cross-linking, so as to achieve a better mechanical stability of the resultant polymer film compared to covalently cross-linked polymer (blend) films made from cation exchange polymers and polymeric sulfinates. A further improvement of the mechanical characteristics is achieved by a controlled incorporation of a cross-linking component containing amino groups, which reacts with the precursors of the cation exchange groups, into the polymer network.

APPLICATION EXAMPLES

The invention will be illustrated in more detail by two examples as follows. The weights/volumes of the components used are listed in table 1.

1. Instruction for Membrane Preparation

Sulfochlorinated PSU Udel® (IEC=1.8 meq $SO_2Cl/g$) and $PSUSO_2Li$ (IEC=1.95 meq $SO_2Li/g$) (for polymer structures see FIG. 2) are dissolved in N-methylpyrrolidinone (NMP). Then α,ω-diiodobutane is added to the solution of the cross-linking agents. After stirring for 15 minutes the solution is filtered and degassed. A thin film of the polymer solution is knife-coated onto a glass plate. The glass plate is placed into a vacuum drying oven and the solvent is removed at temperatures of from 80 to 130° C. at a low pressure of from 700 up to finally 15 mbar. The film is taken out of the drying oven and cooled. The polymer film is peeled off the glass plate underwater and is hydrolyzed/after-treated at first in 10% hydrochloric acid and then in completely desalted water at temperatures of from 60 to 90° C. for 24 h respectively.

2. Used Amounts of Reactants and Characterisation Results

TABLE 1

Used amounts of reactants and characterisation results

| membrane | NMP [g] | PSU—$SO_2Cl$ [g] | PSU—$SO_2Li$ [g] | cross-linking agent [ml] | IEC [meq/g] | swelling [%] | $R_{sp}^{H+}$ [Ωcm] |
|---|---|---|---|---|---|---|---|
| wz10 | 10 | 1 | 1 | 0.3 | 0.2 | 19.3 | 337.6 |
| wz13 | 10 | 1 | 0.4 | 0.12 | 0.85 | 18.3 | 15.2 |

TABLE 1-continued

Used amounts of reactants and characterisation results

| membrane | NMP [g] | PSU—SO$_2$Cl [g] | PSU—SO$_2$Li [g] | cross-linking agent [ml] | IEC [meq/g] | swelling [%] | R$_{sp}^{H+}$ [Ωcm] |
|---|---|---|---|---|---|---|---|
| wz14 | 10 | 1 | 0.3 | 0.09 | 0.56 | 8.6 | 62.6 |
| wz15 | 10 | 1 | 0.2 | 0.06 | 0.7 | 13 | 36.14 |
| wz16 | 10 | 1* | 1* | 0.3 | 0.75 | 11.7 | 31.6 |

*2 SO$_2$Cl groups per PSU repetitive unit

Part 2 of the Application

Covalently Cross-linked Composite Membranes

Prior Art

The invention on which the present additional application is based on relates to a continuation or alternative to the German parent patent application DE 100 24 575.7 (Kovalent vernetzte Polymere und Polymermembranen via Sulfinatalkylierung). The content of this prior German application DE 100 24 575.7 is expressly incorporated herein by reference.

The products and processes, respectively of this above-mentioned parent application are subjected to the following disadvantages:

For membranes which are prepared by the described processes, moistened gases are still needed for operation in the hydrogen fuel cell. If the gases are not moistened, the membrane dries up and the proton conductivity is decreased to a large extent.

To solve this problem, the present application suggests incorporating tectosilicates and phyllosilicates which are optionally functionalized according to the parent application, particularly into a covalent network.

The parent application only describes the incorporation of polymers into the covalent network. When using functionalized phyllosilicates and/or tectosilicates it was surprisingly found, that the compounds which have low molecular functional groups and are bound to the phyllosilicates and/or tectosilicate are not discharged or only moderately discharged during employment of the membrane, especially in the case of employment in a hydrogen fuel cell. This allows an increase in the concentration of ion conductive groups within the covalent network without having the usual effect of extremely deteriorating the mechanical characteristics of the membrane (brittlement or strong swelling). In an extreme case it is therefore possible to completely eliminate the use of enclosed ion conductive polymers in the covalent network. Ion conduction then exclusively occurs via silicates having functional groups.

Thus, the present invention solves the problem of drying up the membrane and of a limitation in the number of ion conductive groups within the membranes to a not marginal extent.

Thus the object of the invention is to provide new covalently cross-linked polymers/membranes displaying proton conductivity even when used with gases which are not moistened or only slightly moistened. Moreover, a further object is to incorporate low molecular functionalized compounds which are coupled to a silicate into the covalent network such that they remain in the membrane for an industrially useful period of time.

Further the process according to the invention helps to solve this object.

DESCRIPTION OF THE INVENTION

The following text expressively refers to the parent patent application DE 100 24 575.7:

A mixture in a suitable solvent, preferably an aprotic one, is prepared, which contains polymers and functionalized tectosilicates and/or phyllosilicates and optionally low molecular compounds.

The mixture contains polymers and the following functional groups:

sulfinate groups SO$_2$Me (Me is a monovalent or polyvalent metal cation)

sulfochloride groups and/or other precursors of cation exchange groups.

Additionally, a bifunctional or oligofunctional alkylation cross-linking agent (typically an α,ω-dihaloalkane) and optionally a secondary diamine cross-linking agent NHR—(CH$_2$)$_x$—NHR is added to the mixture, preferably a polymer solution. The formation of the covalent cross-linking bridges takes place during the formation of the membrane when evaporating the solvent by alkylating the sulfinate groups and optionally by formation of sulfonamide via reaction of the sulfohalide groups present in the polymer with the secondary amino groups of the diamine cross-linking agent. During the acidic and/or basic and/or neutral aqueous after-treatment of the membranes following the formation of the membrane the precursors of the ion exchange groupings are hydrolyzed and oxidized to form ion exchange groups, respectively.

FIG. 1 schematically shows the formation of the covalent cross-linking bridges in blends of sulfochlorinated polymer and sulfinated polymer, FIG. 2 shows the formation of the covalent cross-linking bridges in a polymer containing both sulfinate groups and sulfochloride groups.

The composites according to the invention consist of polymers having the following functional groups:

After membrane preparation, before hydrolysis:

SO$_2$M and/or POM$_2$ and/or CON (M=Hal (F, Cl, Br, I), OR, NR$_2$, R=alkyl, hydroxyalkyl, aryl)

cross-linking bridges:

a) polymer-SO$_2$—Y—SO$_2$-polymer optionally:

b) polymer-SO$_2$—Y'—NR—SO$_2$-polymer c) polymer-SO$_2$—NR—Y"—NR—SO$_2$-polymer After hydrolysis:

—SO$_3$M, —PO$_3$M$_2$, —COOM groups above-mentioned cross-linking bridges

By covalently cross-linking the sulfinate polymers mixed with precursors of ion exchange polymers, especially cation exchange polymers, in the presence of functionalized phyllosilicates and/or tectosilicates a better mixing of the blend phases and thus also a higher degree of cross-linking is achieved, giving raise to a better mechanical stability of the resultant polymer film compared to covalently cross-linked polymer (blend) films made of cation exchange polymers and polymeric sulfinates. By a controlled inclusion of a cross-linking component having amino groups, which reacts with the precursors of the cation exchange groups, into the polymer network a further improvement of the mechanical characteristics is achieved.

By incorporating functionalized tectosilicates and/or phyllosilicates into the covalent network during the formation of the membrane, the water retention capability of the membrane is increased. The functional groups protruding from the surface of the functionalized tectosilicates or phyllosilicate, additionally change the membrane characteristics in accordance with their functionality.

Description of the Inorganic Filler

The inorganic active filler is a phyllosilicate based on montmorillonite, smectite, illite, sepiolite, palygorskite, muscovite, allevardite, amesite, hectorite, talc, fluorhectorite, saponite, beidelite, nontronite, stevensite, bentonite, mica, vermiculite, fluorvermiculite, halloysite, fluor containing synthetical talc types or blends of two or more of the above-mentioned phyllosilicates. The phyllosilicate can be delaminated or pillared. Particularly preferred is montmorillonite.

The weight ratio of the phyllosilicate is preferably from 1 to 80%, more preferably from 2 to 30% by weight, most a preferably from 5 to 20%.

If the functionalized filler, especially zeolites and members of the beidelite series and bentonites, is the only ion-conducting component, its weight ratio is usually in a range of from 5 to 80 wt %, preferably of from 20 to 70 wt % and especially in a range of from 30 to 60 wt %.

Description of the Functionalized Phyllosilicate:

The term "a phyllosilicate" in general means a silicate, in which the $SiO_4$ tetraeders are connected in two-dimensional infinite networks. (The empirical formula for the anion is $(Si_2O_5^{2-})_n$). The single layers are linked to one another by the cations positioned between them, which are usually Na, K, Mg, Al or/and Ca in the naturally occurring phyllosilicates.

By the term "a delaminated functionalized phyllosilicate" we understand phyllosilicates in which the layer distances are at first increased by reaction with so-called functionalisation agents. The layer thickness of such silicates before delamination is preferably 5 to 100 angstrom, more preferably 5 to 50 and most preferably 8 to 20 angstrom. To increase the layer distances (hydrophobisation) the phyllosilicates are reacted (before production of the composites according to the invention) with so-called functionalizing hydrophobisation agents which are often also called onium ions or onium salts.

The cations of the phyllosilicates are replaced by organic functionalizing hydrophobisation agents whereby the desired layer distances which depend on the kind of the respective functionalizing molecule or polymer which is to be incorporated into the phyllosilicate can be adjusted by the kind of the organic residue.

The exchange of the metal ions or protons can be complete or partial. Preferred is the complete exchange of metal ions or protons. The quantity of exchangeable metal ions or protons is usually expressed as milli equivalent (meq) per 1 g of phyllosilicate or tectosilicate and is referred to as ion exchange capacity.

Preferred are phyllosilicates or tectosilicates having a cation exchange capacity of at least 0,5, preferably 0,8 to 1,3 meq/g.

Suitable organic functionalizing hydrophobisation agents are derived from oxonium, ammonium, phosphonium and sulfonium ions, which may carry one or more organic residues.

As suitable functionalizing hydrophobisation agents those of general formula I and/or II are mentioned:

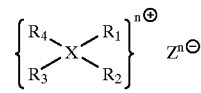   I

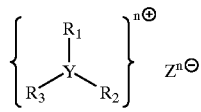   II

Where the substituents have the following meaning:

R1, R2, R3, R4 are independently from each other hydrogen, a straight chain, branched, saturated or unsaturated hydrocarbon radical with 1 to 40, preferably 1 to 20° C. atoms, optionally carrying at least one functional group or 2 of the radicals are linked with each other, preferably to a heterocyclic residue having 5 to 10° C. atoms, more preferably having one or more N atoms.

X represents phosphorous, nitrogen or carbon,

Y represents oxygen or sulfur, n is an integer from 1 to 5, preferably 1 to 3 and Z is an anion.

Suitable functional groups are hydroxyl, nitro or sulfo groups, whereas carboxyl or sulfonic acid groups are especially preferred. In the same way sulfochloride and carboxylic acid chloride groups are especially preferred.

Suitable anions Z are derived from proton delivering acids, in particular mineral acids, wherein halogens such as chlorine, bromine, fluorine, iodine, sulfate, sulfonate, phosphate, phosphonate, phosphite and carboxylate, especially acetate are preferred. The phyllosilicates used as starting materials are generally reacted as a suspension. The preferred suspending agent is water, optionally mixed with alcohols, especially lower alcohols having 1 to 3 carbon atoms. If the functionalizing hydrophobisation agent is not water-soluble, then a solvent is preferred in which said agent is soluble. In such cases, this is especially an aprotic solvent. Further examples for suspending agents are ketones and hydrocarbons. Usually a suspending agent miscible with water is preferred. On addition of the hydrophobizing agent to the phyllosilicate, ion exchange occurs whereby the phyllosilicate usually precipitates from the solution. The metal salt resulting as a by-product of the ion exchange is preferably water-soluble, so that the hydrophobized phyllosilicate can be separated as a crystalline solid, for example, by filtration.

The ion exchange is mostly independent from the reaction temperature. The temperature is preferably above the crystallization point of the medium and below the boiling point thereof. For aqueous systems the temperature is between 0 and 100° C., preferably between 40 and 80° C.

For a cation and anion exchange polymer alkylammonium ions are preferred, in particular if as a functional group additionally a carboxylic acid chloride or sulfonic acid chloride is present in the same molecule. The alkylammonium ions can be obtained via usual methylation reagents such as methyl iodide. Suitable ammonium ions are omega-aminocarboxylic acids, especially preferred are omega-aminoarylsulfonic acids and omega-alkylaminosulfonic acids. Omega-aminoarylsulfonic acids and omega-alkylaminosulfonic acids can be obtained with usual mineral acids, for example hydrochloric acid, sulfuric acid or phosphoric acid or by methylation reagents such as methyl iodide.

Additional preferred ammonium ions are pyridine and laurylammonium ions. After hydrophobizing the layer distance of the phyllosilicates is in general between 10 and 50 angstrom, preferably 13 and 40 angstrom.

The hydrophobized and functionalized phyllosilicate is freed of water by drying. In general a thus treated phyllosilicate still contains a residual water content of 0–5 weight % of water. Subsequently the hydrophobized phyllosilicate can be mixed in form of a suspension in a suspending agent which is free as much as possible from water with the mentioned polymers and be further processed to obtain a membrane.

An especially preferred functionalization of the tectosilicates and/or phyllosilicates is, in general, achieved with modified dyes or their precursors, especially with triphenylmethane dyes. They are represented by the general formula:

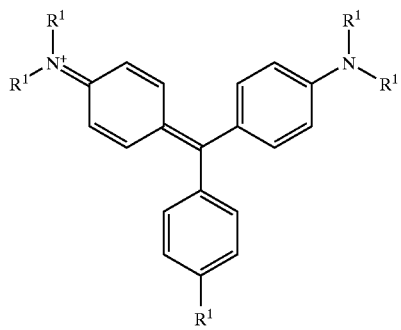

$R^1$=alkyl (especially $CH_3$; $C_2H_5$)

In the present invention dyes derived from the following basic skeleton are used:

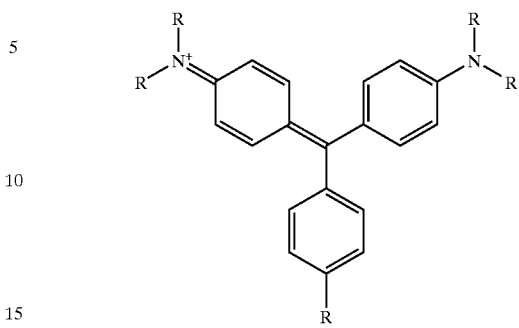

R contains $C_{1-C20}$, and 0–4 N-atoms, and 0–3 S-atoms, R can be charged positively.

In order to functionalize the phyllosilicate the dye or its reduced precursor is sufficiently stirred in an aprotic solvent (e.g. tetrahydrofuran, DMAC, NMP) together with the silicate in a vessel. After 24 hours the dye and the precursor, respectively, is intercalated into the cavities of the phyllosilicate. The intercalation must be such that the ion conductive group is located on the surface of the silicate particle.

The following figure schematically shows the process:

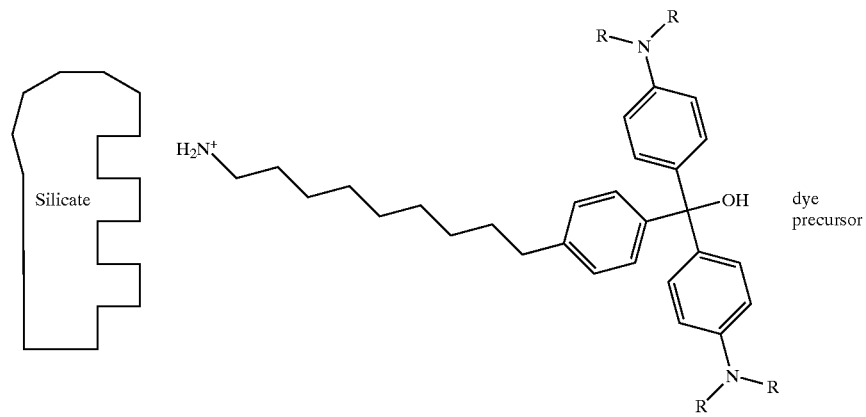

The thus functionalized phyllosilicate is added as an additive to the polymer solution as described in application DE 100 24 575.7. It was found to be especially preferable to use the precursor of the dyes. Only in the acidic aftertreatment the dyes themselves are formed by splitting off water.

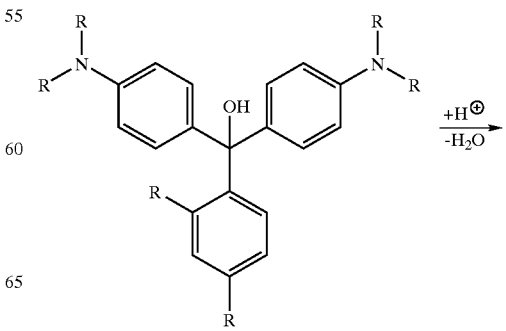

-continued

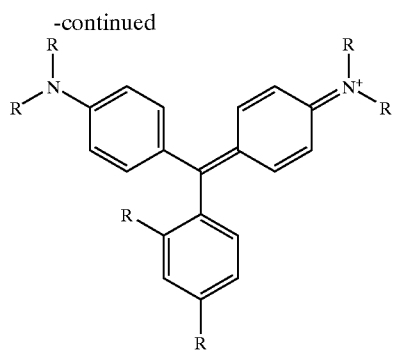

In the case of the triphenylmethane dyes it was hereby surprisingly found that these dyes support the proton conductivity in the membranes prepared thereby. Whether this is even a water-free proton conductivity cannot be stated with sufficient certainty. If the dyes are not bound to the silicate, thus if they are present in the membrane in a free form, they are discharged from the fuel cell with the reaction water already after a short period of time.

According to the invention the polymer blends containing sulfinate groups of the above-mentioned parent application, most preferably the thermoplastic functionalized polymers (ionomers) are added to the suspension of the hydrophobized phyllosilicates. This can be done by using an already dissolved form or the polymers are solubilized in the suspension itself. Preferably the amount of the phyllosilicates is of from 1 to 70 weight %, more preferably of from 2 to 40 weight % and most preferably of from 5 to 15 weight %.

A further improvement with respect to the parent patent application can be the additional blending of zirconyl chloride ($ZrOCl_2$) into the membrane polymer solution and into the cavities of the phyllosilicates and/or tectosilicates. If the after-treatment of the membrane is performed in phosphoric acid, hardly soluble zirconium phosphate precipitates in the direct proximity of the silicate grain in the membrane. Zirconium phosphate shows self-proton conductivity when operating the fuel cell The proton conductivity acts through the formation of hydrogen phosphates as intermediate steps and is part of the state of the art. A controlled inclusion in the direct proximity of a water storing agent (silicates) is novel.

1. Embodiment for Membrane Preparation

Sulfochlorinated PSU Udel® (IEC=1.8 meq $SO_2Cl/g$) and $PSUSO_2Li$ (IEC=1.95 meq $SO_2Li/g$) (for polymer structures see FIG. 2) and montmorillonite functionalized with triphenylmethane dye are dissolved in N-methylpyrrolidinone (NMP). Then α,ω-diiodobutane as a cross-linking agent is added to the solution. After stirring for 15 minutes the solution is filtered and degassed. A thin film of the polymer solution is knife-coated onto a glass plate. The glass plate is placed into a vacuum dry in a oven and the solvent is removed at temperatures of from 50 to 130° C. at a low pressure of from 700 up to finally 15 mbar. The film is taken out of the drying oven and cooled. The polymer film is peeled off the glass plate underwater and is hydrolyzed/after-treated at first in 10% hydrochloric acid and then in completely desalted water at temperatures of from 60 to 90° C. for 24 h, respectively.

2. Embodiment

Sulfochlorinated PSU Udel® (IEC=1.2 meq $SO_2Cl/g$) and $PSUSO_2Li$ (IEC=1.95 meq $SO_2Li/g$) and montmorillonite treated with α,ω-aminoalkylsulfochloride (with sulfochloride groups facing to the outside) are dissolved in N-methylpyrrolidinone (NMP). Then the cross-linking agent α,ω-diiodobutane is added to the solution. After stirring for 15 minutes the solution is filtered and degassed and processed to a membrane as described in example 1.

This membrane has a higher IEC value after curing than a control without the functionalized phyllosilicate.

3. Embodiment

Sulfochlorinated PSU Udel® (IEC=1.8 meq $SO_2Cl/g$) and $PSUSO_2Li$ (IEC=1.95 meq $SO_2Li/g$) (for polymer structures see FIG. 2) and montmorillonite treated with zirconyl chloride are dissolved in dimethylsulfoxide (DMSO).

The dissolution takes place in the following order: First montmorillonite K10 is suspended in DMSO and 10 weight % zirconyl chloride, based on the total membrane amount, is added. Then the other polymer components are added. Then the cross-linking agent α,ω-diiodobutane is added to the solution. After stirring for 15 minutes the solution is filtered and degassed. A thin film of the polymer solution is knife-coated onto a glass plate. The glass plate is placed into a vacuum drying oven and the solvent is removed at temperatures of from 80 to 130° C. at a low pressure of from 700 up to finally 15 mbar. The film is taken out of the drying oven and cooled. The polymer film is peeled off the glass plate under phosphoric acid and stored in phosphoric acid at a temperature of between 30 and 90° C. for about 10 hours and then optionally further hydrolyzed/after-treated in 10% hydrochloric acid and then in completely desalted water at temperatures of from 60 to 90° C. for 24 h respectively.

We claim:

1. A covalently cross-linked polymer, polymer blend, or covalently cross-linked polymer membrane comprising one or more polymers which optionally have the following functional groups
   a) precursors of cation exchange groups selected from the group consisting of $SO_2M$, $POM_2$, COM, or mixtures thereof,
   b) sulfinate groups $SO_2Me$, or mixtures thereof where M is independently Hal, OR, $NR_2$, Hal is F, Cl, Br, I, R is independently alkyl, hydroxyalkyl, aryl; X is independently Hal, OR, Y, and Me is independently H, Li, Na, K, Cs, a metal cation, or an ammonium ion,
   where at least some of the polymers are covalently cross-linked by
   c) a difunctional, trifunctional or oligofunctional haloalkane or haloaromatic, which has been reacted with sulfinate groups $SO_2Me$, and
   where the following cross-linking bridges are present in the polymer/polymer blend/polymer membrane:
   polymer-$SO_2$—Y—$SO_2$-polymer where Y is the crosslinking bridge —$(CH_2)_x$—, -arylene-, —$(CH_2)_x$-arylene-, —$CH_2$-arylene-$CH_2$—, and x is 3–12); and/or
   polymer-$SO_2$—$(CH_2)_x$—NR—$SO_2$-polymer where compounds containing Hal-$(CH_2)_x$—NHR, which have been reacted on the Hal- side with sulfinate groups $SO_2Me$ and on the —NHR side with $SO_2M$-groups; and/or
   polymer-$SO_2$—NR—$(CH_2)_x$—NR—$SO_2$-polymer where compounds containing the group NHR—$(CH_2)_x$—NHR, which have been reacted with $SO_2Me$ groups.

2. The covalently cross-linked polymer blend or polymer blend membrane of claim 1, wherein the blend comprises at least one polymer comprising at least $SO_2M$ groups and at least one polymer comprising at least $SO_2Me$ groups.

3. The covalently cross-linked polymer blend or polymer blend membrane of claim 1 wherein a polymer comprises $SO_2M$ groups and $SO_2Me$ groups.

4. The covalently cross-linked polymer blend or polymer blend membrane of claim 1 wherein one or more base polymers having the functional groups are selected from the group consisting of polyether sulfones, polysulfones, polyphenylsulfones, polyether ether-sulfones, polyether ketones, polyether ether ketones, polyphenylene ether, polydiphenylphenylene ether, polyphenylene sulfide, or copolymers containing at least one of these components.

5. The covalently cross-linked polymer blend or polymer blend membrane of claim 1 wherein a polymer comprises a functional group which can be lithiated, said lithiation providing ionic crosslinking between polymers.

6. The covalently cross-linked polymer blend or polymer blend membrane of claim 5 wherein the functional group which can be lithiated comprises polysulfones, polyphenylene ether or a combination or mixture thereof.

7. The covalently cross-linked polymer blend or polymer blend membrane of claim 1 wherein the cross-linking agents comprises $Hal-(CH_2)_x-Hal$, $Hal-CH_2$-phenylene-$CH_2$-Hal, or a mixture thereof, where x is a number between 3 and 12 and Hal is independently F, Cl, Br, or I.

8. The covalently cross-linked polymer blend or polymer blend membrane of claim 1 wherein the $SO_2M$ groups, $POM_2$ groups, COM groups, or combinations thereof in the polymer or polymer membrane are further hydrolyzed to cation exchange groups $SO_3Me$, $PO_3Me_2$, or COOMe, respectively, where Me is independently H, Li, Na, K, Cs, a metal cation, or ammonium ion by the after-crosslinking treatment comprising immersing the polymer or polymer membrane in
   a) 1–50 weight % aqueous alkali at a temperature ranging from ambient to 95° C.;
   b) completely desalted water at a temperature ranging from ambient to 95° C.;
   c) 1–50 weight % aqueous mineral acid at a temperature ranging from ambient to 95° C.; or
   d) a combination thereof; for a time necessary to hydrolyze the $SO_2M$ groups, $POM_2$ groups, or COM groups.

9. A process for preparing covalently cross-linked polymers, polymer blends or polymer blend membranes according to claim 1 comprising:
   dissolving the polymers simultaneously or successively in a dipolar aprotic solvent;
   adding a cross-linking agent where the cross-linking agent is homogeneously dispersed in the polymer solution by stirring,
   optionally filtering and degassing the polymer solution,
   evaporating at least a portion of the solvent by heating to 80° to 130° C., by applying low pressure, by circulating heating gas around the polymer sollution, or a combination thereof.

10. The process of claim 9 wherein the dipolar aprotic solvent is selected from the group consisting of N,N dimethylformamide (DMF), N,N-dimethylacetamide (DMAc), N-methylpyrrolidinone (NMP), dimethylsulfoxide (DMSO), sulfolane, or mixture thereof.

11. The process of claim 9 wherein the polymer solution is formed into a membrane by spreading the polymer solution on a base, and farther comprising optionally peeling off the polymer membrane from the base after evaporating the solvent, and curing the membrane by contacting the membrane with a 1–50 weight % aqueous alkali at a temperature ranging from ambient to 95° C.;

water at a temperature ranging from ambient to 95° C.;

a 1–50 weight % aqueous mineral acid at a temperature ranging from ambient to 95° C.;

a completely desalted water at a temperature ranging from ambient to 95° C.; or a combination of two or more of said aqueous compositions in succession.

12. A membrane in an electrochemical converter, said membrane comprising the crosslinked polymer of claim 1.

13. The membrane of claim 12 wherein the electrochemical converter is a $H_2$ or direct methanol fuel cell, wherein said membrane is kept at a temperature from 0° to 180° C.

14. The membrane of claim 12 wherein the electrochemical converter is a secondary battery.

15. The membrane of claim 12 wherein the electrochemical converter is an electrolytic cell.

16. The membrane of claim 1 wherein the membrane is adapted to allow differential permeation of compounds to promote gas separation, pervaporation, perstraction, reverse osmosis, electrodialysis or diffusion dialysis.

17. The covalently cross-linked polymer or polymer membrane of claim 1 further comprising one or more polymers and tectosilicates and/or phyllosilicates, wherein the tectosilicates and/or phyllosilicates present can be functionalized or not functionalized.

18. A covalently cross-linked composite polymer or covalently cross-linked composite polymer membrane comprising one or more polymers and tectosilicates, phyllosilicates, or a mixture thereof, wherein the tectosilicates and/or phyllosilicates present can be functionalized or not functionalized, and wherein the polymers are characterized in that they have the following functional groups
   a) precursors of cation exchange groups: $SO_2M$, $POM_2$, COM, or mixture thereof; and
   b) sulfinate groups $SO_2Me$, where M is independently Hal, OR, $NR_2$, or mixture thereof; Hal is independently F, Cl, Br, or I; R is independently alkyl, hydroxyalkyl, or aryl; Me is independently H, Li, Na, K, Cs a metal cation, or ammonium ion;

and wherein the polymers are covalently cross-linked by:
   a) difunctional, trifunctional or oligofunctional haloalkanes or haloaromatics which have been reacted with sulfinate groups $SO_2Me$, where polymer-$SO_2$—Y—$SO_2$-polymer cross-linking bridges are present in the polymer, where Y is the cross-linking bridge —$(CH_2)_x$—, -arylene-, —$(CH_2)_x$-arylene-, —$CH_2$-arylene-$CH_2$—, or mixture thereof, and x is 3–12, X is independently Hal or OR; and/or
   b) compounds containing the following groups: Hal-$(CH_2)_x$—NHR, which have been reacted on the one side (Hal-) with sulfate groups $SO_2Me$ and on the other side (—NHR) with $SO_2M$ groups, and where polymer-$SO_2$—$(CH_2)_x$—NR—$SO_2$-polymer cross-linking bridges are present in the polymer; and/or
   c) compounds containing the following groups: NHR—$(CH_2)_x$—NHR which have been reacted with $SO_2Me$ groups, and where polymer-$SO_2$—NR—$(CH_2)_x$—NR—$SO_2$-polymer cross-linking bridges are present in the polymer.

19. The covalently cross-linked polymer blend or polymer blend membrane according to claim 18, characterized in that it is composed of the following polymers:

a) a polymer with at least $SO_2M$ groups, and b) a polymer with at least $SO_2Me$ groups.

20. The covalently cross-linked polymer blend or polymer blend membrane according to claim 18, characterized in that the polymer comprises a polymer comprising $SO_2M$ groups and $SO_2Me$ groups.

* * * * *